S. KOHN.
AUTOMATIC STOP.
APPLICATION FILED NOV. 29, 1916.

1,430,564.

Patented Oct. 3, 1922.
3 SHEETS—SHEET 3.

Inventor
Samuel Kohn
By Mauro, Cameron, Lewis & Massie
Attorneys

Patented Oct. 3, 1922.

1,430,564

UNITED STATES PATENT OFFICE.

SAMUEL KOHN, OF BRIDGEPORT, CONNECTICUT, ASSIGNOR, BY MESNE ASSIGNMENTS, TO COLUMBIA GRAPHOPHONE MANUFACTURING COMPANY, OF BRIDGEPORT, CONNECTICUT, A CORPORATION OF DELAWARE.

AUTOMATIC STOP.

Application filed November 29, 1916. Serial No. 134,153.

*To all whom it may concern:*

Be it known that I, SAMUEL KOHN, a subject of the King of Hungary, and a resident of Bridgeport, Connecticut, have invented a new and useful Improvement in Automatic Stops, which invention is fully set forth in the following specification.

This invention relates to stop mechanism and, while capable of use in a variety of machines, is particularly designed as a stop-mechanism for talking machines.

In machines of the latter type, a traveling element in the form of a sound-reproducing or recording member traverses a rotating element in the form of a sound-record tablet, said traveling element, when a sound reproducing member, usually being propelled across said rotating element by the record groove in said tablet.

It is an object of this invention to provide a simplified and improved stop-mechanism whereby the rotating element is stopped upon the cessation of movement of the traveling element, as when the latter reaches the end of the groove in said tablet.

A further object of this invention is to provide a stop-mechanism of the type characterized with means whereby, at the beginning of the operation of the machine, ample time will be afforded to properly position the sound-reproducing member in the desired groove of the record tablet without danger of a premature stopping of the latter, said stop-mechanism still being promptly actuated to stop the rotation of the rotating element when the traveling element reaches the end of its traverse.

Other objects relate to the provision of a stop-mechanism that shall be simple in construction and efficient in operation.

Stated briefly, the invention comprises, in combination with a rotating element, a traveling element and any suitable stop-mechanism, as a brake or switch, for arresting the rotation of said rotating element, a member for actuating said stop-mechanism, means operatively connected with said traveling element for moving said member in one direction, and means operatively connected with said rotating element for moving said member in the opposite direction, said member becoming operatively related to said stop-mechanism or to one of said means, or to both, only after a predetermined number of revolutions of said rotating element. To this end, a rotary member, shown as a gear, is provided with means, as spaced lugs, for actuating the stop-mechanism, said gear being driven in one direction, preferably intermittently, by means connected with the rotating element, and being driven in the opposite direction, as by contact with one of said lugs, by means frictionally connected with the traveling element. Said lugs are so spaced and positioned as to assume operative relationship with the stop-mechanism and the means connected with the traveling element only after a predetermined number of actuations of the gear by the means connected with the rotating element.

The invention is capable of receiving a variety of mechanical expressions, one of which is shown on the accompanying drawings, but it is to be expressly understood that the drawings are for purposes of illustration only and are not to be construed as a definition of the limits of the invention.

Referring to said drawings—

Figure 1:
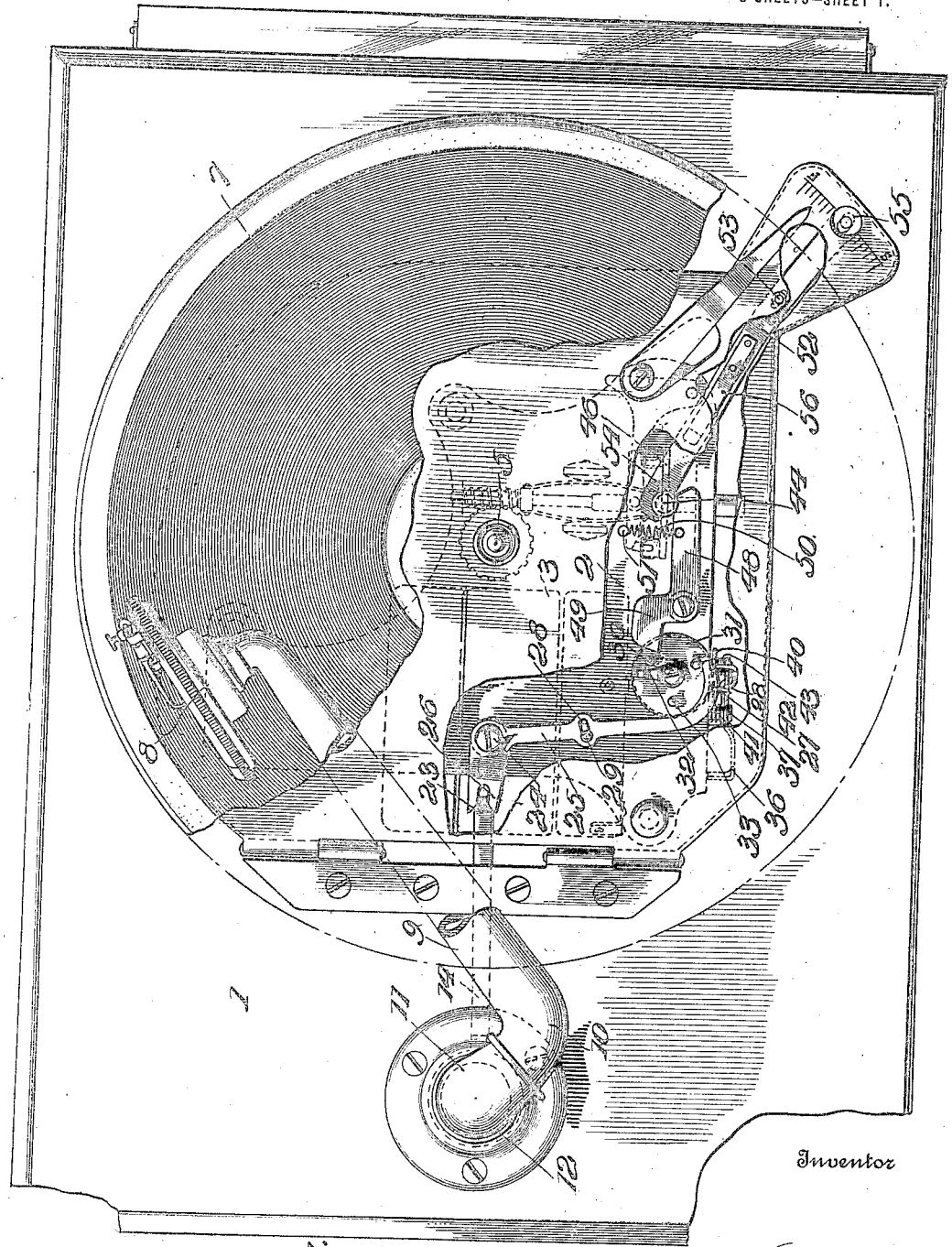
Fig. 1 is a plan view of a talking machine provided with stop-mechanism embodying the present invention, parts being broken away for the sake of clearness.
Figure 2:
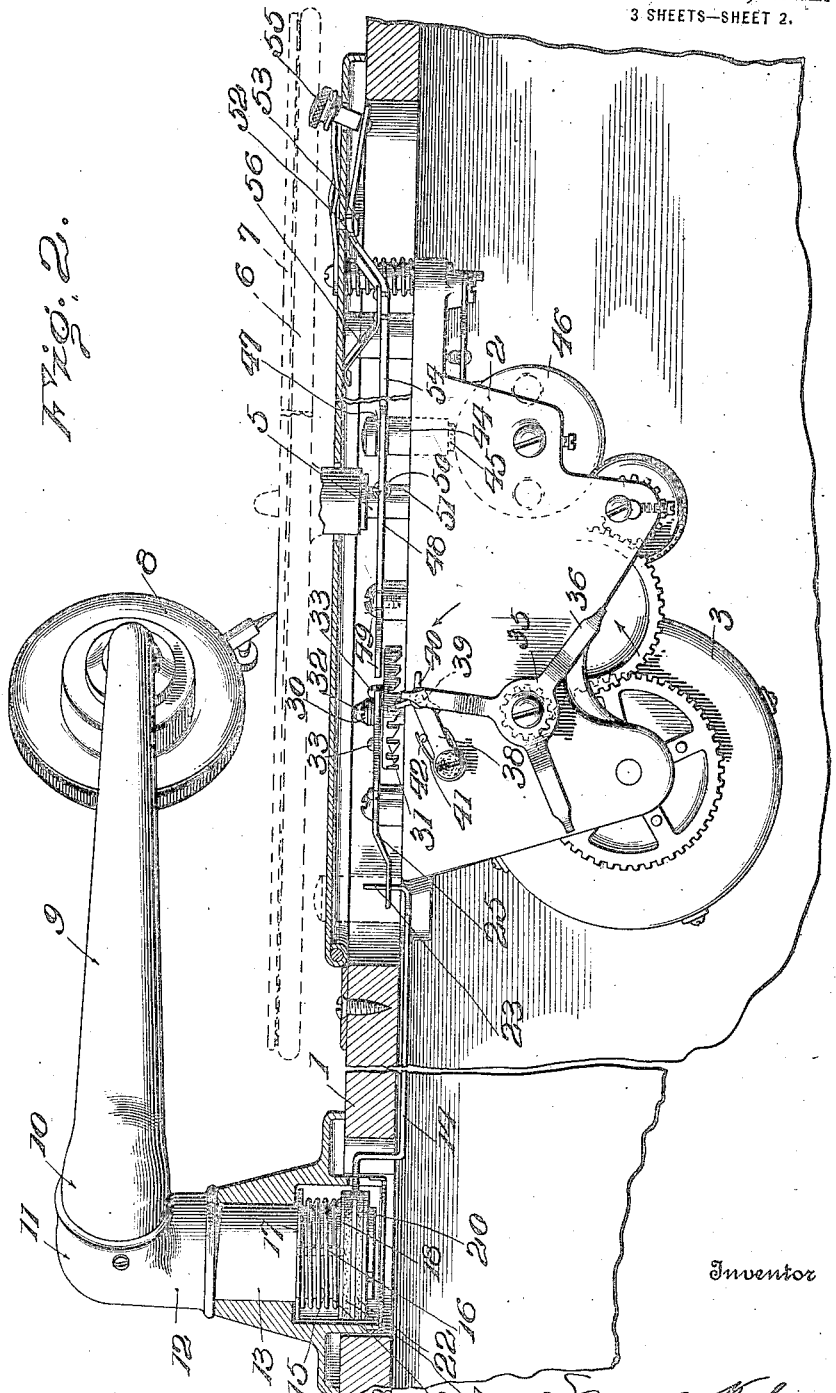
Fig. 2 is a cross section showing said stop-mechanism in elevation.
Figure 3:
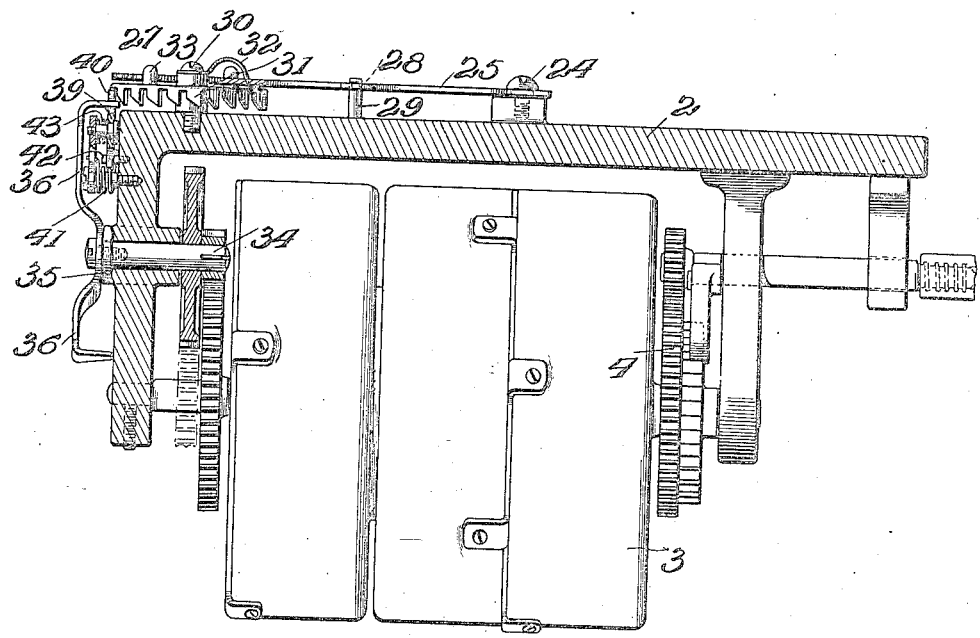
Fig. 3 is a cross section on a plane at right angles to Fig. 2, showing certain elements of the stop-mechanism in elevation.
Figure 4:
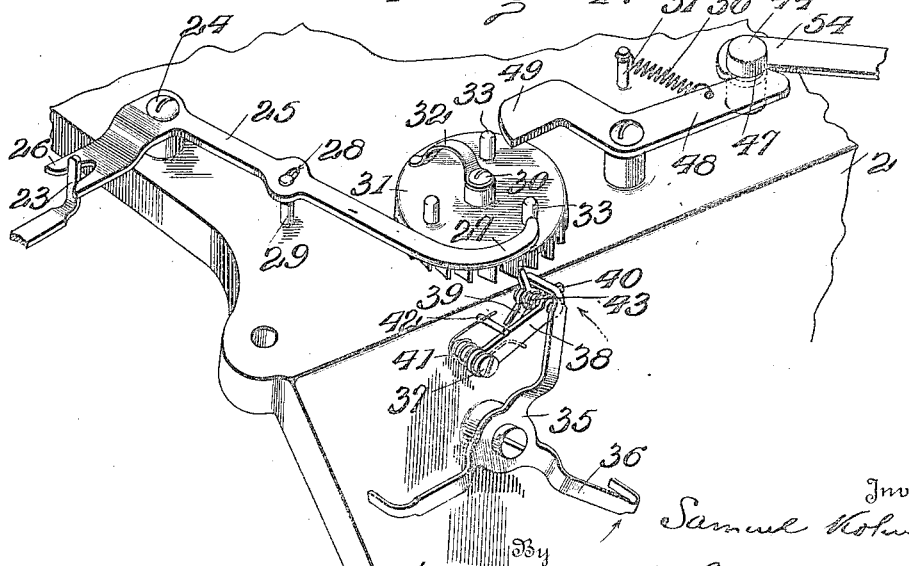
Fig. 4 is a perspective view of the rotary member for actuating the stop-mechanism and the means for driving said member in opposite directions.

Referring in detail to said drawings, wherein the same reference characters designate corresponding parts in the several figures, 1 represents the cabinet of any preferred type of talking machine, 2 the motor-frame thereof, 3 any suitable motor, in the present instance conventionally shown as a spring motor with winding mechanism 4, 5 the turn-table spindle, 6 the turn-table, and 7 a record supported thereon, said record or any suitable rotary driving element constituting a rotating element within the purview of this invention. 8 designates any suitable sound-box mounted in any suitable way to traverse the record 7, shown in the present instance as carried by a sound conduit 9 pivoted for vertical movement about a horizontal axis determined by the coacting laterally directed ends 10 and 11 of said conduit 9 and a rotatably mounted elbow 12, said conduit and elbow constituting a tone-arm. While the tone-arm in the present instance is shown as in communication with an amplifier within the cabinet 1, it is to be understood that the invention is of equal utility when applied to a tone-arm directed upwardly at its outer end to communicate with an amplifier disposed above the machine.

Mounted upon the depending end of the elbow 12, and shown as frictionally driven therefrom, is an arm 14. Any suitable means for frictionally driving this arm from the tone-arm may be employed. In the present embodiment, the lower extremity of said elbow is reduced as shown at 15 and provided with a key 16. Mounted on the reduced portion 15 and engaging the shoulder formed thereby, with a key-way engaging the key 16, is a washer 17 between which and a second similar washer 18 is a coiled spring 19. The arm 14 is rotatably mounted upon the reduced portion 15 beyond the end of key 16 and between the washer 18 and a bayonet retaining-nut 20, frictional washers 21 and 22 being shown as separating said arm from said washer 18 and said bayonet nut 20. Thereby is the arm 14 frictionally gripped between the washers 21 and 22, owing to the resiliency of the coiled spring 19, enabling said arm to be driven from or to be moved with respect to said tone-arm.

Arm 14 is bent downwardly adjacent its connection to the tone-arm to clear the cabinet top, and at its inner end is provided with an upwardly directed finger 23. Pivotally mounted, as on the motor-frame at 24, is a bell-crank lever 25 provided at one end with bifurcations 26 between which said finger 23 is received, and provided at its opposite end with a hook-shaped extension 27. Lever 25 is also provided with a slot 28 coacting with a relatively stationary pin 29, which may be mounted on the motor-frame, for limiting the extent of movement of said lever.

Rotatably mounted on a pin 30 is a crown gear 31, preferably with its teeth on its lower face, a leaf-spring 32 being desirably mounted on said pin and bearing on said gear to retain the latter stationary when the same is not subjected to rotary impulses from the traveling element or the rotary element. One of the faces of said gear, preferably the upper, is provided with a plurality of spaced lugs 33, three being shown. These lugs, which are symmetrically spaced, are designed to assume such relationship to the hooked end 27 of the lever 25 that, when said lever is driven in an anti-clockwise direction, the hooked extension, by engagement with one of said lugs, will rotate the gear in an anti-clockwise direction.

Means are provided for rotating gear 31, preferably intermittently, in a clockwise direction and preferably from the talking machine motor. To this end, a shaft 34, which may be one of the usual shafts of the motor carrying intermediate pinions in the drive of the table, is provided with an extension upon which is mounted to rotate therewith an intermittent gear 35, shown as comprising three equally-spaced arms 36 provided with inwardly bent extremities. Pivotally mounted on the motor-frame by pin 37 is an arm 38 carrying at its outer end an intermittent gear 39 shown as comprising three radial arms 40. To urge arm 38 to such a position that arms 40 coact with the teeth of crown gear 31 and are in the line of movement of the inwardly directed extremities of the arms 36, a spring 41 is coiled about said pin 37, one end thereof bearing upon the arm 38 and the other end engaging any suitable fixed projection, as a pin 42 on the motor-frame. While intermittent gear 39 is thus resiliently maintained in coacting relationship with crown gear 31, it may give with respect thereto by movement of arm 38 about pin 37 against the tension of spring 41 to prevent injury to the parts should gear 31 become accidentally locked against rotation. A spring 43 is also desirably coiled about the axis of the intermittent gear 39 between said gear and the arm 38 to frictionally retain this gear stationary when the same is not subjected to rotary impulses from the intermittent gear 35.

Any suitable stop-mechanism, as a brake or switch, may be provided for operation by the crown gear 31. In the form shown, a plunger 44 is provided with frictional material 45 to coact with the sliding collar 46 of any conventional governor. Plunger 44, adjacent its upper end, is grooved as shown at 47, with which groove coacts a bell-crank lever 48 having one end 49 in the path of movement of the lugs 33. Lever 48 is normally urged into engagement with said groove 47 by a spring 50 secured at one end to said lever and at its opposite end to a pin 51 projecting from the motor-frame. To manually withdraw the plunger 44 from engagement with the governor collar 46, a lever 52 is pivotally mounted at 53 on the underside of the motor-board and shaped at its inner end 54 to engage within the groove 47 in said plunger. At its opposite end, lever 52 coacts with a press-button 55 whereby the same may be manually operated. A spring 56 secured to said lever engages the motor-board at its free end and normally urges said lever, with the plunger 44 connected thereto, into stopping relation with the collar 46.

When the machine is to be started, the operator, by depressing button 55, elevates lever 52 about its pivot 53 against the tension of spring 56 to a position wherein the lever 48 is in alinement with groove 47, whereupon spring 50 draws the outer end of said lever into said groove to retain the plunger in its upper position.

Upon starting the reproduction the traveling element or tone-arm traverses the rotating element or record-tablet in a clockwise direction as shown, and arm 14 is urged in the same direction whereby, owing to the coaction of said arm with the bell-crank lever 25, the hooked extremity 27 of the latter is urged in an anti-clockwise direction until stopped by pin 29, arm 14 then slipping with respect to the depending end of the tone-arm because of the friction connection provided. Also, when the motor is started, succeeding arms 36 of gear 35 intermittently engage and rotate succeeding arms 40 of gear 39. At each actuation of an arm 40, said arm engages a tooth of the crown gear 31 and rotates the same through a fraction of a revolution. After a predetermined number of revolutions of the record-tablet, determined by the number of teeth and lugs on the crown gear as well as by the number of arms on the intermittent gears and the ratio of rotation of shaft 34 to that of the turn-table spindle, one of the lugs 33 comes into coacting relationship with the hooked end 27 of the lever 25. Thereafter, so long as the tone-arm continues to traverse the record-tablet, gear member 31 is subjected to intermittent impulses for rotating the same in opposite directions. At each actuation of the intermittent gear 39, gear member 31 is advanced in a clockwise direction through one tooth, and the lug 33 coacting with the hooked end 27 engages said hooked end and rotates the bell-crank lever 25 in a clockwise direction, said lever simultaneously moving arm 14 in an anti-clockwise direction, which movement is permitted by the frictional connection of this arm to the depending extension of the tone-arm. During the time which elapses before the next actuation of the intermittent gear 39, the normal movement of the tone-arm frictionally moves arm 14 in a clockwise direction, said arm simultaneously moving the bell-crank lever in an anti-clockwise direction. During this movement of the lever 25, hooked end 27 engages and cams the coacting lug 33 and rotates gear member 31 in an anti-clockwise direction. Gear member 31 is therefore rotated intermittently in opposite directions from the traveling element and the rotating element, so long as the former continues its traverse.

When one of said lugs 33 was advanced into coacting relationship with end 27 of lever 25, another of said lugs was advanced into proximity to end 49 of lever 48, but so long as gear member 31 is rotated intermittently in opposite directions, it never comes into contact therewith. When the traveling element ceases its advance, however, no further rotation of the gear 31 in an anti-clockwise direction occurs, whereupon said gear member continues to be rotated in a clockwise direction from the motor and lug 33 adjacent end 49 of lever 48 engages said end 49, moving said lever in a clockwise direction about its pivot against the tension of the spring 50 and withdrawing its opposite end from coaction with the groove 47 of plunger 44. Spring 56 thereupon throws lever 52 and plunger 44 so as to engage the friction material 45 with the sliding collar 46 of the governor and stop the rotation of the motor. As lug 33 thus trips lever 48 it moves out of stopping relation therewith, whereby gear member 31 must again make one-third of a revolution before the succeeding lugs come into coacting relationship with levers 25 and 48.

By a proper selection of the rate of rotation of shaft 34, the number of teeth on the intermittent gears, the number of teeth on the crown gear, and the number of lugs on said crown gear, it will be perceived that any desired predetermined number of revolutions of the table may be required before said lugs assume operative relationship with the lever 25 and the trip lever 48. Thus, as an illustration, if the table is designed to have eighty-one revolutions per minute and the speed-reducing gearing between the motor and the table is so designed that there shall be one revolution of shaft 34 to nine revolutions of said table, then, if the intermittent gear 35 be provided with three arms, the crown gear with twenty-one teeth, and the latter gear with three equally-spaced lugs, it will require twenty-one revolutions of the table before gear 31 is rotated through one-third of a revolution, i. e., from the position assumed by the parts at the stopping of the machine to that position in which succeeding lugs come into cooperative relationship with said levers 25 and 48.

While the illustrated embodiment of the invention has been described with considerable particularity, it is to be expressly understood that the invention is not to be restricted thereto but is capable of receiving a variety of mechanical expressions, some of which will readily suggest themselves to those skilled in the art, while certain features thereof are capable of use without other features thereof. Reference is therefore to be had to the appended claims for a definition of the limits of this invention.

What is claimed is:

1. In combination, a rotating element, a traveling element, stop mechanism, a rotary member for actuating said stop mechanism and having means adapted to be operatively related therewith, means operatively connected with said traveling element for turning said member in one direction, and means operatively connected with said rotating element for turning said member in the opposite direction, said member becoming operatively related to said stop mechanism only after a predetermined number of revolutions of said rotating element.

2. In combination, a rotating element, a traveling element, stop mechanism, a rotary member for actuating said stop mechanism and having means adapted to be operatively related therewith, means operatively connected with said traveling element for turning said member in one direction, and means operatively connected with said rotating element for turning said member in the opposite direction, said member becoming operatively related to said stop mechanism and said second-mentioned means only after a predetermined number of revolutions of said rotating element.

3. In combination, a rotating element, a traveling element, stop mechanism, a rotary member provided with means to actuate said stop mechanism, means operatively connected with said traveling element for rotating said member in one direction, and means operatively connected with said rotating element for rotating said member in the opposite direction, said means on said rotary member being so positioned with respect thereto as to become operatively related to said stop mechanism and said first-mentioned means only after a predetermined number of revolutions of said rotating element.

4. In combination, a rotating element, a traveling element, stop mechanism, a rotary member provided with means to actuate said stop mechanism, means operatively connected with said traveling element for rotating said member in one direction, and means operatively connected with said rotating element for rotating said member in the opposite direction, said means on said rotary member being so positioned with respect thereto as to become operatively related to said stop mechanism only after a predetermined number of revolutions of said rotating element.

5. In combination, a rotating element, a traveling element, stop mechanism, a rotary member for actuating said stop mechanism and having means adapted to be operatively related therewith, means operatively connected with said traveling element for rotating said member in one direction, and means operatively connected with said rotating element for intermittently rotating said member in the opposite direction, said rotary member becoming operatively related to said stop mechanism only after a predetermined number of intermittent actuations thereof.

6. In combination, a rotating element, a traveling element, stop mechanism, a rotary member for actuating said stop mechanism and having means adapted to be operatively related therewith, means operatively connected with said traveling element for rotating said member in one direction, and means operatively connected with said rotating element for intermittently rotating said member in the opposite direction, said rotary member becoming operatively related to said second-mentioned means and said stop mechanism only after a predetermined number of intermittent actuations thereof.

7. In combination, a rotating element, a traveling element, stop mechanism, a rotary member for actuating said stop mechanism and having means adapted to be operatively related therewith, means operatively connected with said traveling element for rotating said member in one direction, and means operatively connected with said rotating element for intermittently rotating said member in the opposite direction said first-mentioned means becoming operatively related to said member only after a predetermined number of actuations thereof.

8. In combination, a rotating element, a traveling element, stop mechanism, a member for actuating said stop mechanism and having means adapted to be operatively related therewith, means operatively connected with said traveling element for moving said member in one direction, and means operatively connected with said rotating element for moving said member in the opposite direction, said second-named means becoming operatively related to said member only after a predetermined number of revolutions of said rotating element.

9. In combination, a rotating element, a traveling element, stop mechanism, a rotary member provided with means to actuate said stop mechanism, means operatively connected with said traveling element for rotating said member in one direction, and means operatively connected with said rotating element for rotating said member in the opposite direction, said second-named means becoming operatively related to said means on said rotary member only after a predetermined number of revolutions of said rotating element.

10. In combination, a rotating element, a traveling element, stop mechanism, a rotatable member, means operatively connected with said rotating element for intermittently rotating said member, means driven from said traveling element for rotating said member in the opposite direction, and means on said member to actuate said stop mechanism when said last-named means ceases to operate.

11. In combination, a rotating element, a traveling element, stop mechanism, a rotatable member, means operatively connected with said rotating element for intermittently rotating said member, means frictionally connected with and driven from said traveling element for rotating said member in the opposite direction, and means on said member to actuate said stop mechanism when said last-named means ceases to operate.

12. In combination, a rotating element, a traveling element, stop mechanism, a rotary toothed member, means operatively connected with said rotating element for intermittently engaging the teeth of said member to rotate the same, means driven from said traveling element for rotating said member in the opposite direction, and means on said member to actuate said stop mechanism when said last-named means ceases to operate.

13. In combination, a rotating element, a traveling element, stop mechanism, a rotary toothed member, means operatively connected with said rotating element for intermittently engaging the teeth of said member to rotate the same, means frictionally connected with and driven from said traveling element for rotating said member in the opposite direction, and means on said member to actuate said stop mechanism when said last-named means ceases to operate.

14. In combination, a rotating element, a traveling element, stop mechanism, a crown gear, means operatively connected with said rotating element for intermittently rotating said gear, means driven from said traveling element for rotating said gear in the opposite direction, and means on said gear for actuating said stop mechanism when said last-named means ceases to operate.

15. In combination, a rotating element, a traveling element, stop mechanism, a rotary member, means operatively connected with said rotating element for intermittently rotating said member, means driven from said traveling element for rotating said member in the opposite direction, and a lug on said member for actuating said stop mechanism when said last-named means ceases to operate.

16. In combination, a rotating element, a traveling element, stop mechanism, a rotary gear member, means operatively connected with said rotating element for intermittently rotating said gear member, means driven from said traveling element for rotating said gear member in the opposite direction, and equally spaced lugs on said gear member for actuating said stop mechanism when said last-named means ceases to operate, there being fewer lugs than teeth on said gear member whereby said gear member must be advanced a plurality of times to bring succeeding lugs into operative relation with said stop mechanism.

17. In combination, a rotating element, a traveling element, stop mechanism, a rotary member, means operatively connected with said rotating element for intermittently rotating said member, means driven from said traveling element for rotating said member in the opposite direction, and a lug on said member for actuating said stop mechanism when said last-named means ceases to operate, said lug being so positioned that said means driven from the traveling element operatively engages said member just prior to said lug operatively engaging said stop mechanism.

18. In combination, a rotating element, a traveling element, stop mechanism, a rotary member provided with a lug and adapted to actuate said stop mechanism, means operatively connected with said rotating element for rotating said member in one direction, and means adapted to coact with said lug and driven from said traveling element for rotating said member in the opposite direction.

19. In combination, a rotating element, a traveling element, stop mechanism, a rotary member provided with spaced lugs, one of which is adapted to actuate said stop mechanism, means operatively connected with said rotating element for rotating said member in one direction, and means adapted to coact with another of said lugs and driven from said traveling element for rotating said member in the opposite direction, such other lug adapted to assume operative relation with said last-named means only after a predetermined number of revolutions of said rotating element.

20. In combination, a rotating element, a traveling element, stop mechanism, a rotary member provided with spaced lugs, one of which is adapted to actuate said stop mechanism, means operatively connected with said rotating element for rotating said member in one direction, and means adapted to coact with another of said lugs and driven from said traveling element for rotating said member in the opposite direction, the first lug adapted to assume operative relation with said stop mechanism only after a predetermined number of revolutions of said rotating element.

21. In combination, a rotating element, a traveling element, stop mechanism, a rotary member provided with lugs, one of which is to actuate said stop mechanism, means operatively connected with said rotating element for intermittently rotating said member in one direction, and means adapted to coact with one of said lugs and frictionally driven from said traveling element for rotating said member in the opposite direction.

22. In combination, a rotating element, a traveling element, stop mechanism, a rotary member for actuating said stop mechanism, means operatively connected with said rotating element for rotating said member in one direction, said means comprising a gear yieldingly mounted for movement into and out of engagement with said member, and means driven from said traveling element for rotating said member in the opposite direction.

23. In combination, a rotating element, a traveling element, stop mechanism, and a member controlled by said rotating and traveling elements and adapted to mechanically actuate said stop mechanism upon the stopping of said traveling element, said member being so constructed as to become operatively related to said stop mechanism only after a predetermined number of revolutions of said rotating element.

24. In combination, a rotating element, a traveling element, stop mechanism, and a member controlled by said rotating and traveling elements and adapted to mechanically actuate said stop mechanism upon the stopping of said traveling element, said member being so constructed as to come under the control of said traveling element only after a predetermined number of revolutions of said rotating element.

25. In combination, a rotating element, a traveling element, stop mechanism, a member for actuating said stop mechanism, means operatively connected with said rotating element for advancing said member into approximate stop-actuating position while said element makes a predetermined number of revolutions, and means operatively connected with said traveling element for preventing said member from actuating said stop mechanism while said traveling element continues its traverse.

26. In combination, a rotating element, a traveling element, stop mechanism, a rotating member carrying an element for actuating said stop mechanism, means operatively connected with said rotating element for rotating the element on said member into approximate stop-actuating position while said rotating element makes a predetermined number of revolutions, and means operatively connected with said traveling element for preventing said element on said member from actuating said stop mechanism while said traveling element continues its traverse.

27. In combination, a rotating element, a traveling element, stop mechanism, a member for actuating said stop mechanism, means operatively connected with said rotating element for intermittently advancing said member into approximate stop-actuating position while said rotating element makes a predetermined number of revolutions, and means operatively connected with said traveling element for preventing said member from actuating said stop mechanism while said traveling element continues its traverse.

28. In combination, a rotating element, a traveling element, stop mechanism, a member for actuating said stop mechanism, means operatively connected with said rotating element for advancing said member into approximate stop-actuating position, and means operatively connected with said traveling element for thereafter preventing said member from actuating said stop mechanism while said traveling element continues its traverse.

29. In combination, a rotating element, a traveling element, stop mechanism, a rotary member carrying an element for actuating said stop mechanism, means operatively connected with said rotating element for rotating the element on said member into approximate stop-actuating position, and means operatively connected with said traveling element for thereafter preventing the element on said member from actuating said stop mechanism while said traveling element continues its traverse.

30. In combination, a rotating element, a traveling element, stop mechanism, a member for actuating said stop mechanism, means operatively connected with said rotating element for intermittently advancing said member into approximate stop-actuating position, and means operatively connected with said traveling element for thereafter preventing said member from actuating said stop mechanism while said traveling element continues its traverse.

31. In combination, a rotating element, a traveling element, stop mechanism, a member for actuating said stop mechanism, means operatively connected with said rotating element for intermittently advancing said member into approximate stop-actuating position, and means operatively connected with said traveling element for thereafter intermittently moving said member in the opposite direction to prevent the same from actuating said stop mechanism while said traveling element continues its traverse.

32. In combination, a rotating element, a traveling element, stop mechanism, a member for actuating said stop mechanism, means operatively connected with said traveling element for moving said member in one direction, and means operatively connected with said rotating element for moving said member in the opposite direction, said member becoming operatively related to one of said means only after a predetermined number of revolutions of said rotating element.

33. In combination, a rotating element, a traveling element, stop mechanism, a rotating member for actuating said stop mechanism and having means adapted to be operatively related therewith, means operatively connected with said rotating element for moving said member in one direction, and means operatively connected with said traveling element for moving said member in the other direction while said traveling element continues its traverse thereby maintaining it out of stop-actuating position, said last-named means becoming operative only after said member has been rotated an appreciable time.

34. In combination with a rotating element and a traveling element, a stop mechanism for the rotating element, including a movable member and a stop element, said movable member adapted, after it has made a certain progression, to operatively relate the traveling element, the rotating element, and the stop element, and means whereby the brake member is applied upon cessation of travel of the traveling element.

35. In combination with a rotating element and a traveling element, a stop mechanism for the rotating element, including a rotatable member adapted to be moved by one of said elements and a stop element, said rotatable member adapted, after it has made a certain progression, to operatively relate the traveling element, the rotating element, and the stop element, and means whereby the stop element is actuated upon cessation of travel of the traveling element.

36. In combination with a rotating element and a traveling element, a stop mechanism for the rotating element, including a rotatable member and a stop element, said rotatable member adapted to be rotated by the rotating element, and after it has made a certain progression to operatively relate the traveling element and the stop element, whereby the stop element is prevented from operating during the travel of the traveling element.

37. In combination with a rotating element and a traveling element, a stop mechanism for the rotating element, including a rotatable member and a stop element, said rotatable member adapted to be rotated by the rotating element, and means on the rotating element adapted to be operatively related to the traveling element after the rotatable member has made a certain progression, and whereby the stop element is prevented from operating during the travel of the traveling element.

38. In combination with a rotating element and a traveling element, a stop mechanism for the rotating element, including a rotatable member and a stop element, said rotatable member adapted to be rotated by the rotating element, and means on the rotating element adapted to be operatively related to the stop element after the rotatable member has made a certain progression, whereby the stop element is operated upon cessation of travel of the traveling element.

39. In combination with a rotating element and a traveling element, a stop mechanism for the rotating element, including a rotatable member and a stop element, said rotatable member adapted to be rotated by the rotating element, and a plurality of means on the rotating element adapted to be respectively related with the stop element and the traveling element after the rotatable member has made a certain progression, and whereby the stop element is prevented from operating during the travel of the traveling element, and is operated upon cessation of such travel.

40. In combination, a rotating element, a traveling element, stop mechanism, a member for actuating the stop mechanism, means operatively connected with the rotating element for advancing the member into approximate stop-actuating position while the rotating element makes a predetermined number of revolutions, means operatively connected with the traveling element and coacting with the member only when the member is in approximate stop-actuating position for preventing movement of said member into final stop-actuating position while the traveling element continues its traverse, and means on said member coacting with the first-named means for moving said member to actuate the stop mechanism upon the stopping of the traveling element.

41. In combination, a rotatable element, a traveling element, stop mechanism, a member for actuating the stop mechanism, means operatively connected with the rotating element for advancing the member into approximate stop-actuating position while the rotating element makes a predetermined number of revolutions, means operatively connected with the traveling element for thereafter moving the member intermittently in the opposite direction, and means on the member coacting with the first-named means upon the stopping of the traveling element for moving the member to actuate the stop mechanism.

42. In combination, a rotatable element, a traveling element, stop mechanism, a member adapted to actuate the stop mechanism, means operatively connected with the traveling element for moving the member in one direction, means operatively connected with the rotating element for moving the member in the opposite direction, and means on the member coacting with the last-named means for moving the member into stop-actuating position, the means on the member becoming operatively related to the last-named means only after a predetermined number of revolutions of the rotating element.

43. In combination, a rotating element, a motor for rotating the same hinged to its support, a traveling element, stop mechanism, a member adapted to actuate the stop mechanism, means operatively connected with the rotating element for moving the member, and means operatively connected with the traveling element for controlling the member, the last-named means comprising an element connected to the traveling element, an element movable with the motor about the hinge, and a disconnectible connection between the last-named elements whereby the elements may be moved freely into and out of engagement about said hinge.

44. In combination, a rotating element, a traveling element, stop mechanism, a member for actuating the stop mechanism adapted to be moved in two directions, and adapted at one stage of its movement in one direction to actuate the stop mechanism, means actuated by the rotating element adapted to intermittently move the member in the direction to actuate the stop mechanism, and adapted to move the member during a plurality of revolutions of the rotating element to approximate stop-actuating position, means actuated by the traveling element adapted to intermittently move the member alternately to the movement by the rotating element, and in opposite direction to maintain the member in such approximate stop-actuating position, the member adapted to be moved to stop-actuating position upon cessation of the movement of the traveling element.

45. In combination, a rotating element, a traveling element, stop mechanism, a rotatable member co-operatively related to the rotating element, the traveling element and the stop mechanism, and adapted to be primarily moved in one direction by the rotating element to approximate stop-actuating position, and to a position of co-operation with the traveling element, the traveling element adapted to intermittently move the member in a direction opposed to the movement by the rotating element, a member adapted to be moved to stop-actuating position upon cessation of the movement of the traveling member.

46. In combination, a rotating element, a traveling element, stop mechanism, a rotatable member co-operatively related to the roatating element, the traveling element and stop mechanism, and adapted to have complete free rotation in one direction, and to have free oscillatory movement, the member adapted to be primarily moved in one direction through a substantially complete revolution to approximate stop-actuating position, and to a position of co-operation with the traveling element, the traveling element adapted to intermittently move the member in a direction opposed to the movement by the rotating element, the member adapted to be moved to stop-actuating position upon cessation of the movement of the traveling element.

47. In combination with a rotating element and a traveling element, stop mechanism, including a traveling member, a brake member, a connection between the traveling and brake members, including a rotatable member, and a detent, the detent being movable pivotally and out of engagement with the rotatable member.

48. In combination, a rotating element, a traveling element, stop mechanism, a rotary member for actuating the same, means operatively connected with the rotating element for intermittently rotating the member in one direction, the means comprising a rotary pawl, and means operatively connected with the traveling element for rotating the member in the opposite direction intermittently while the traveling element continues its traverse.

49. In combination, a rotating element, a traveling element, stop mechanism, a rotary member adapted to have complete free rotation in one direction, and to have free oscillatory movement, means operatively connected to the rotating element for intermittently rotating the rotary member in one direction, through equal increments throughout its rotary movement, and means operatively connected with the traveling element for rotating said member in the opposite direction intermittently, while the traveling element continues its travel.

50. In combination with a rotating element and a traveling element, stop mechanism for the rotating element, including a rotatable member, having uniformly intermittent movement, a brake member and a traveling member, means for connecting the traveling member and the brake member when the rotatable member has made a certain progression, and means for preventing the brake member from actuating until after the traveling element has ceased to travel.

51. In combination with a rotating element and a traveling element, stop mechanism for the rotating element, including a rotatable member adapted to be actuated by the rotating element, and having uniformly intermittent movement, a brake member and a traveling member, means for connecting the traveling member and the brake member when the rotatable member has made a certain progression, and means for preventing the brake member from actuating until after the traveling element has ceased to travel.

52. In combination, a rotating element, a traveling element, stop mechanism, a member for actuating said stop mechanism, means operatively connected with the rotating element for advancing said actuating member into approximate stop actuating position while said rotating element makes a predetermined number of revolutions, and means operatively connected with the traveling element for preventing said actuating member from moving into final stop actuating position while said traveling element continues its traverse.

53. In combination, record rotating means, sound reproducing means associated therewith, means for stopping the rocord rotating means at the completion of the record, said means including a combined rotating and oscillating member, and means preventing the operation of said last named means during the initial record playing period.

In testimony whereof I have signed this specification.

SAMUEL KOHN.